United States Patent [19]

Ohyanagi et al.

[11] Patent Number: 5,275,545
[45] Date of Patent: Jan. 4, 1994

[54] VACUUM CAST MOLDING APPARATUS

[75] Inventors: Yu Ohyanagi; Michifumi Suzuki, both of Tokyo, Japan

[73] Assignee: Kabushiki Kaisha San-Al, Tokyo, Japan

[21] Appl. No.: 23,810

[22] Filed: Feb. 25, 1993

[30] Foreign Application Priority Data

| Feb. 26, 1992 | [JP] | Japan | 4-075408 |
| Feb. 26, 1992 | [JP] | Japan | 4-075409 |
| Feb. 26, 1992 | [JP] | Japan | 4-018043 |
| Feb. 26, 1992 | [JP] | Japan | 4-018044 |
| Feb. 26, 1992 | [JP] | Japan | 4-018045 |
| Feb. 26, 1992 | [JP] | Japan | 4-075407 |
| Feb. 26, 1992 | [JP] | Japan | 4-075410 |

[51] Int. Cl.$^5$ .................. B29C 39/42; B29C 39/44
[52] U.S. Cl. .................. 425/73; 425/135; 425/173; 425/200; 425/203; 425/420; 425/546; 425/812; 425/DIG. 60
[58] Field of Search .......... 425/73, 388, 4 R; 425/135; 425/149; 425/156; 425/159; 425/173; 425/200; 425/203; 425/420; 425/812; 425/546; 425/DIG. 60; 425/73; 425/210

[56] References Cited

U.S. PATENT DOCUMENTS

| 3,267,517 | 8/1966 | Altermatt | 425/546 |
| 4,256,444 | 3/1981 | Suter | 425/73 |
| 4,521,172 | 6/1985 | Gilbert | 425/73 |
| 4,997,355 | 3/1991 | Yamauchi et al. | 425/116 |

FOREIGN PATENT DOCUMENTS

WO87/06878 11/1987 PCT Int'l Appl. ......... 425/DIG. 60

*Primary Examiner*—Khanh Nguyen
*Attorney, Agent, or Firm*—Robert W. J. Usher

[57] ABSTRACT

A vacuum cast molding apparatus includes a plurality of vacuum chambers which can be brought into communication with each other, a plurality of depressurizing devices to evacuate each of the vacuum chambers respectively, a plurality of mixing and injecting devices installed in each of the vacuum chambers, to mix, agitate and inject molding materials into dies installed in each of the vacuum chambers, and separators installed removably between the vacuum chambers for partitioning each of the vacuum chambers. The vacuum chambers can be used independently when the separators are installed to partition them from each other. The vacuum chambers can also be used as one large vacuum chamber when the separators are removed bringing the chambers into communication with each other.

15 Claims, 13 Drawing Sheets

VACUUM CAST MOLDING APPARATUS

BACKGROUND OF THE INVENTION

1. Field of the Invention

The present invention relates to a vacuum cast molding apparatus for defoaming, mixing, agitating and injecting molding materials into a die under vacuum.

2. Description of the Prior Art

A vacuum cast molding process is performed to make duplicated resin products of a master model. The process comprises the steps of making a die of the master model of silicon rubber, injecting (or pouring) liquid resin such as mixed polyurethane liquid into the silicon die, and solidifying it therein. Conventionally, vacuum cast molding apparatuses, which can be used to mix and agitate liquid resin and inject the resin into the silicon die under vacuum, have been used in the cast molding work.

In the conventional type of vacuum cast molding apparatuses, however, the size of the vacuum chamber in each cast molding apparatus, in which a silicon die is placed, cannot be changed. Therefore, several sizes of cast molding apparatus must be built according to sizes of cast molding products to be produced.

In the type of cast molding process as described above, operations of devices in a vacuum chamber such as a mixing and injecting device are controlled by an operator by operating the operator panel. Cast molding operations in the vacuum chamber can be observed through a viewing window provided on an external wall of the vacuum chamber. The operator operates the operator panel appropriately while observing the molding operations in the vacuum chamber.

However, in this type of vacuum cast molding apparatus, the position of the operator panel may often be remote from that of the viewing window. Therefore, the operator must move between the operator panel and the viewing window during the molding operation, which is troublesome.

The viewing window is made of a glass plate. Since the external surface of the glass plate is directly exposed to the outside of the vacuum chamber, the glass plate might be broken as a result of an impact thereon from outside. If the glass plate is broken under vacuum, the broken glass pieces are sucked into the vacuum chamber by external atmospheric pressure and collide against internal walls of the vacuum chamber, and then spurt out through an opening for the viewing window to outside.

The vacuum chamber is divided to an upper portion and a lower portion, each communicating with each other. The mixing and injecting device is installed in the upper portion and the silicon die is installed in the lower portion. Liquid molding materials mixed and agitated in the mixing and injecting device are injected or poured into the silicon die through a funnel. A lower edge port of the funnel is connected via a vinyl hose to a injection port formed in a silicon die, so that the molding materials smoothly flow into the silicon die.

The vinyl hose connecting the lower edge port of the funnel to the injection port of the silicon die is discarded and exchanged with a new one each time after cast molding work is carried out. When removing the old (or used) vinyl hose, if an operator bends the vinyl hose and faces the upper opening downward, molding materials remaining inside the hose may be spilled therefrom and contaminate inside of the vacuum chamber. In addition, when attaching a new hose, the hose may be bent unnecessarily, which may prevent molding materials from flowing smoothly into the die.

In cast molding operation using this type of vacuum cast molding apparatus, bubbles are always generated in molding materials when the materials are agitated. Therefore, the materials cannot flow into a die smoothly. In addition, in a die having a complicated internal configuration, it is difficult to spread molding materials to every internal corner space of the die even under vacuum.

SUMMARY OF THE INVENTION

An object of the present invention is to provide a vacuum cast molding apparatus which can be used to produce cast molding products having various sizes and also to produce a plurality of products simultaneously.

Another object of the present invention is to provide a vacuum cast molding apparatus, wherein the vacuum chamber can be divided or partitioned by separators into a plurality of small vacuum chambers and a plurality of cast molding operations can be carried out in each vacuum chamber independently.

Still another object of the present invention is to provide a vacuum cast molding apparatus, in which molding operations in the vacuum chamber can be displayed on a monitor so that an operator can easily operate the operator panel while monitoring the operations in the vacuum chamber.

A further object of the present invention is to provide a vacuum cast molding apparatus having a viewing window which is strengthened against an impact from outside, in which spurting of glass pieces to the outside can be prevented even if the glass plate is broken.

A still further object of the present invention is to provide a vacuum cast molding apparatus, in which an injection path hose for molding materials can easily be attached without moving a die up or down.

A more specific object of the present invention is to provide a vacuum cast molding apparatus and a cast molding method, wherein bubbles generated in molding materials can be removed under vacuum, and molding materials can easily be flowed into a die.

To achieve the objects as described above, the vacuum cast molding apparatus according to the present invention comprises a plurality of, (preferably two), vacuum chambers which can be brought into communication with each other, a plurality of, (preferably two), depressurizing devices to evacuate each of the vacuum chambers, a plurality of, (preferably two), mixing and injecting devices installed in each of the vacuum chambers, to mix, agitate and inject molding materials into dies installed in each of the vacuum chambers, and separators installed removably between the vacuum chambers for partitioning each of the vacuum chambers. Thus each vacuum chambers can be used independently when the separators are installed, while, the plurality of vacuum chambers can be used as one large vacuum chamber when the separators are removed.

The vacuum chambers are placed in series in a lateral direction so that the plurality of vacuum chambers form one laterally enlarged vacuum chamber when said separators are removed. Each vacuum chamber has a door. One of the vacuum chambers which is located at one end has an opening on a side wall thereof for mounting the door. Accordingly, the opening faces the laterally enlarged vacuum chamber in a lateral direction. The rest of the vacuum chambers have openings for mounting the doors on front walls thereof, respectively.

The vacuum cast molding apparatus can further comprise a controller to control the depressurizing devices and the mixing and injecting devices and connection and disconnection detecting means to detect whether the separators are installed or removed. The controller controls each of the depressurizing devices and mixing and injecting devices independently when the detecting means detects that the separators are installed, while the controller controls the depressurizing devices and the mixing and injecting or independently devices correlatively when the detecting means detects that the separators are removed.

Furthermore, an operating panel is provided on respective the vacuum chambers. When the detecting means detects the installation of the separators, the controller controls the depressurizing devices and the mixing and injecting devices independently based on operating signals from the corresponding control panel. When the detecting means detects the removal of the separators, the controller controls the depressurizing devices and the mixing and injecting devices correlatively based on control signals from one of the control panels.

The separator comprises a pair of partition plates placed in parallel with each other, and an expanding and contacting means to move the partition plates laterally. The separator is inserted into a separator accepting portion formed between the adjacent vacuum chambers. The partition plates can be expanded outwardly in the lateral direction by the expanding and contacting means to come in contact with the side walls of the adjacent vacuum chambers to partition air-tightly the adjacent vacuum chambers from each other.

TV cameras for monitoring molding operations in the vacuum chamber and displays for displaying images from the TV cameras are provided in each of the vacuum chambers, respectively.

A viewing window for observing the molding operations in the vacuum chamber is provided on each of the vacuum chambers. The viewing window comprises a glass plate attached to an aperture formed in a wall of the vacuum chamber, and a covering plate member made of transparent plastic and attached on the aperture so as to cover the glass plate from outside.

The mixing and injecting devices are placed in an upper portion of each of the vacuum chambers and located above the die placed in a lower portion thereof, respectively. The mixing and injecting devices can be moved vertically by respective lift devices.

DETAILED DESCRIPTION OF THE PREFERRED EMBODIMENT

Figure 1:
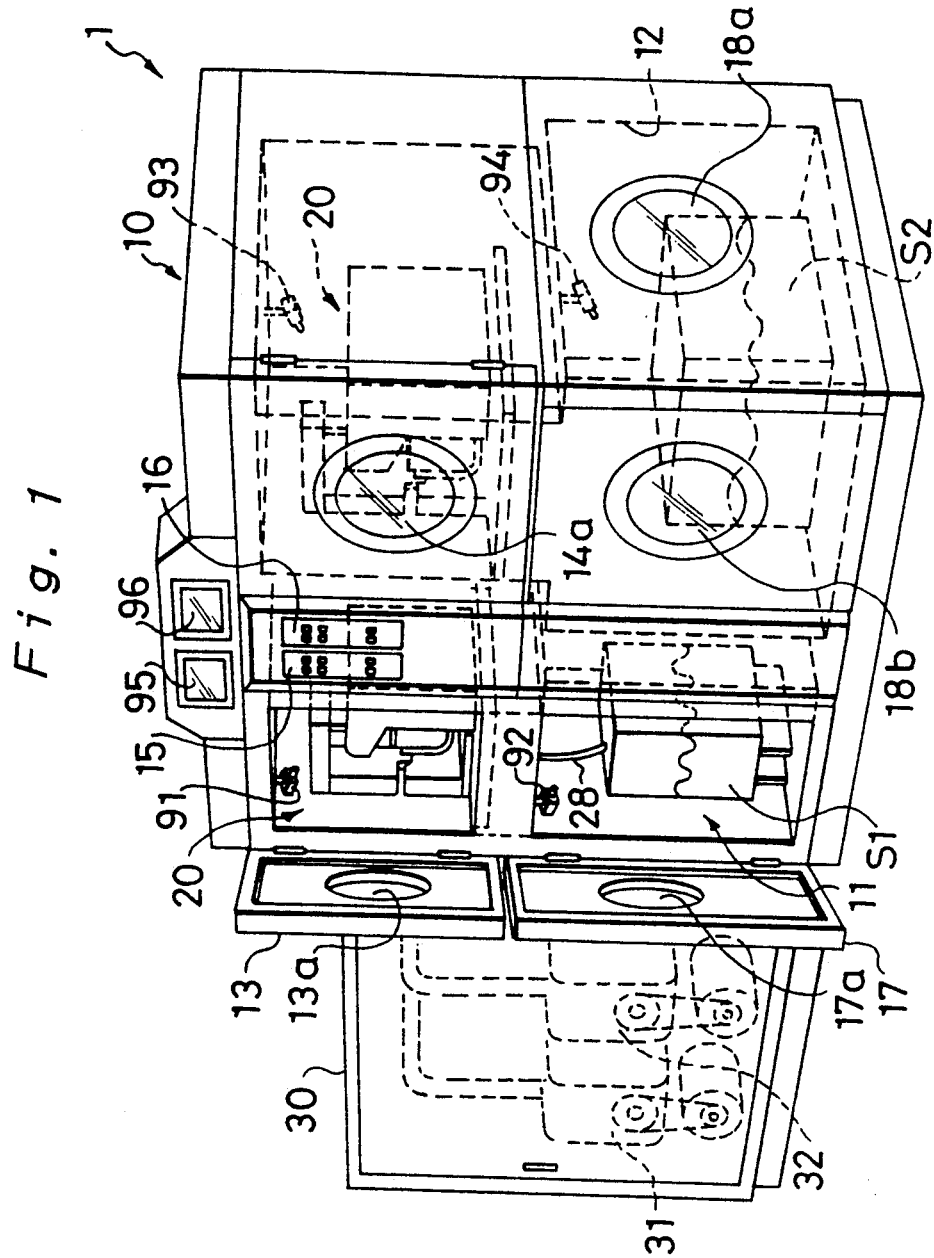
FIG. 1 is a perspective view of a vacuum cast molding apparatus according to the present invention.

FIG. 1 shows a vacuum cast molding apparatus 1 according to the present invention. In a basic housing body 10 of the vacuum cast molding apparatus 1, two vacuum chambers (a first vacuum chamber 11 and a second vacuum chamber 12) each of which extends in the vertical direction are formed in the right and left sides, respectively.

Mixing and injecting devices 20 are installed in the upper portions of the vacuum chambers 11 and 12, respectively. As shown in detail in FIG. 2, a mixing and injecting device 20 comprises a curing agent feeding device 21 located in the right side of the vacuum chamber 11, an injecting device 22 located at a center of the vacuum chamber 11, and a agitating device 23 attached to the upper portion of the injecting device 22.

In the curing agent feeding device 21, an A cup 24 to accept the curing agent is supported detachably and swingably with an injection port 24a facing to the center of the vacuum chamber 11. The A cup 24 can be inclined so that the left side goes down by driving the curing agent feeding device 21.

In the injecting device 22, a B cup 25 to accept the main molding materials is supported detachably and swingably with an injection port 25a facing forward. The B cup 25 can be inclined forward by driving the injecting device 22. The B cup has a cylindrical outer shape and an almost flat bottom surface.

The agitating device 23 is attached to the upper portion of the injecting device 22, and an agitating vane 26 which extends inside the B cup 25 and rotates therein is attached to the agitating device 23. When the injecting device 22 is in operation, the agitating device 23 is inclined and moves forward together with the B cup 25.

Figure 3:
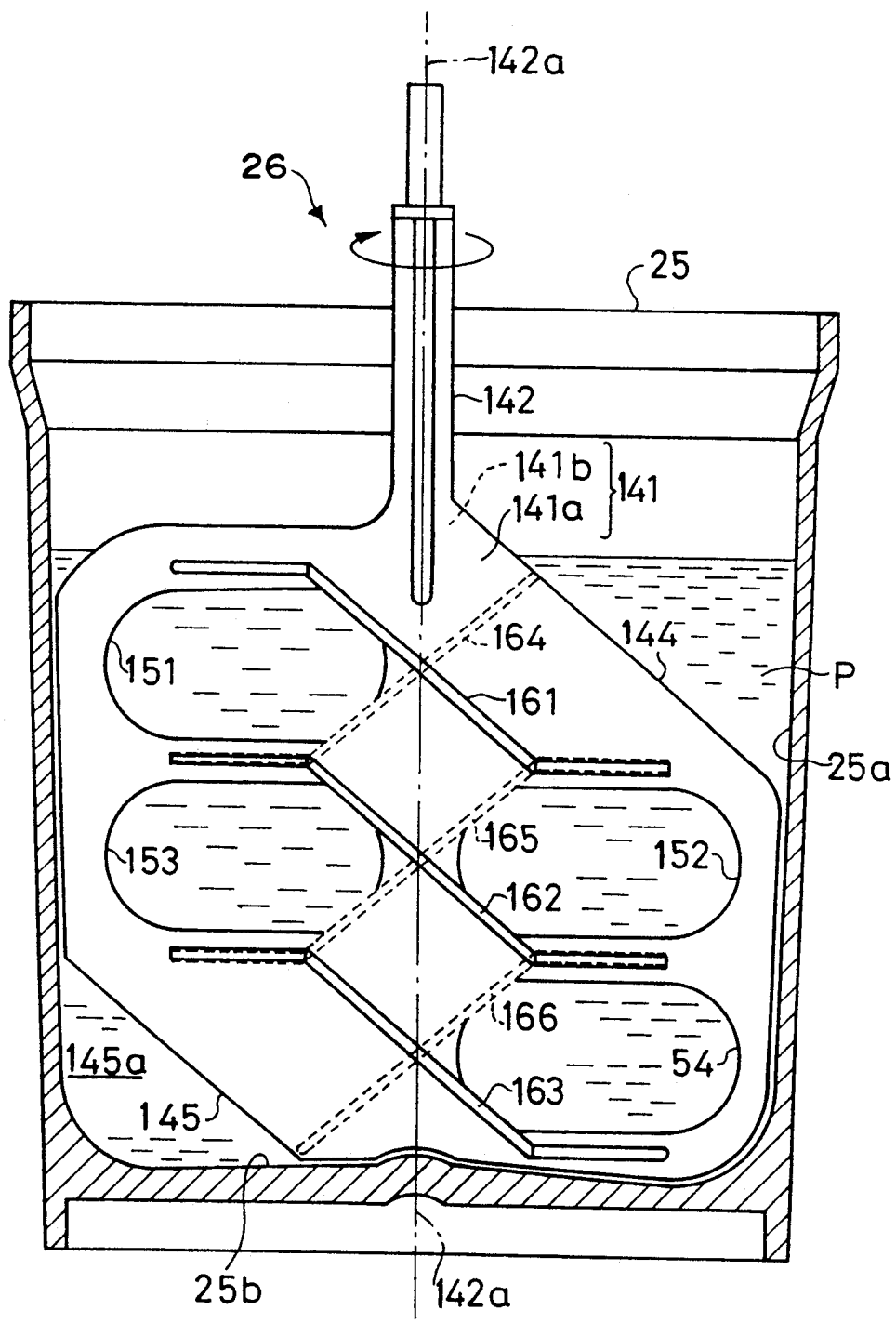
FIG. 3 is a front elevational view of a vane for agitation used in the mixing and injecting device above.

As shown in FIG. 3 in detail, the agitating vane 26 comprises a vane or blade 141 to be inserted into the B cup 25 which accepts molding materials (materials to be agitated), and a mounting shaft portion 142 integrally formed therewith formed and extending upward from the center of the upper portion of the vane portion 141. The vane portion 141 rotates in the horizontally right direction (clockwise when viewed from the top) on a rotating shaft 142a extending in the vertical direction.

The vane portion 141, which rotates as described above, is plate-form, and the external edge surface extends along an internal side wall surface 25a and a bottom surface 25b of the B cup 25. As shown in the figure, a notch 144 (called "upper notch" hereinafter) having a wall inclining with the right side down is formed in the right upper portion of the vane portion 141, while a notch 145 (called "lower notch") having a wall inclining with the right side down is formed in the left lower portion of the vane portion 141. Because of this construction, the lower notch 145 forms a passage 145a for molding materials P between the internal wall surface 25a and the bottom surface 25b of the B cup 25.

In addition, in the left upper portion, right central portion, left central portion and right lower portion of the vane portion 141, through-holes 151-154 extending from a front surface 141a (the surface shown in FIG. 3) of the vane portion 141 to the rear surface 141b (a surface not shown in FIG. 3). The through-hole in the left upper portion is hereinafter called a first through-hole 151, that in the right central portion called a second through-hole 152, that in the left central portion called a third through-hole 153, and that in the right lower portion called a forth through-hole 154. Thus, both notches 144 and 145 and all the through-holes 151 to 154 are located in the right and left portions in 3 levels in the vertical direction so that they enclose the rotating shaft 142a from both sides.

Figure 4:
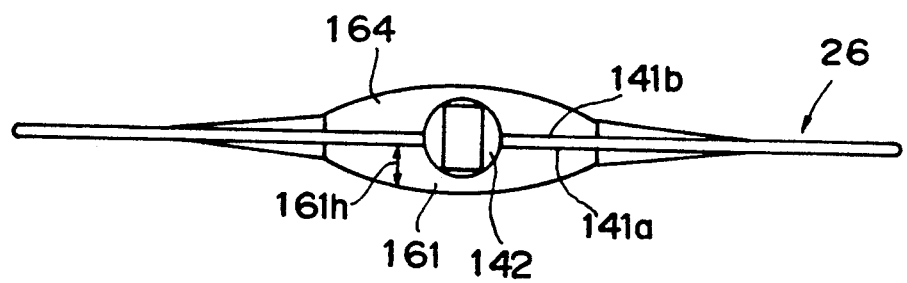
FIG. 4 is a plan view of the vane for agitation.

A first guide wing 161 inclining downward as it extends to the right is provided near the rotating shaft 142a in the surface 141a of the vane portion 141 so that the upper portion of the first through-hole 151 communicates with the upper portion of the second through-hole 152. As shown in FIG. 4, the first guide wing 161 is of increasing width in the horizontal direction, (the vertical direction in FIG. 4), as it approaches the rotating shaft 142a.

Wing constructions having the same form as that of a first guide wing 161 are also on the vane portion extending provided between the portion under the first through-hole 151 (above the third through-hole 153) and a portion under the second through-hole 152 (above the fourth through-hole 154) in the surface 141, and between a portion under the third through-hole 153 and a portion under the fourth through-hole 154. The upper and lower wing constructions are called second the guide wing 162 and the third guide wing 163 respectively.

A fourth guide wing 164, a fifth guide wing 165, and a sixth guide wing 166, each having the same construction as that of the first guide wing 161, are arranged to extend between the upper portion of the upper wall notch 144 on the rear surface 141b of the vane portion 141 and the portion under the first through-hole 151, between the portion above the second through-hole 152 and the portion under the third through-hole 153, and between the portion above the fourth through-hole 154 and the wall of lower portion of the lower notch 145 respectively.

A funnel 27 is attached to the front lower portion of the B cup 25, and a hose 28 extending to the lower sections of the vacuum chambers 11 is connected to the lower portion of this funnel.

As shown in FIG. 1, vacuum pumps, (a first vacuum pump 31 and a second vacuum pump 32), attached to the vacuum chambers 11 and 12 are installed in a pump rack provided outside the basic body 10.

Figure 5:
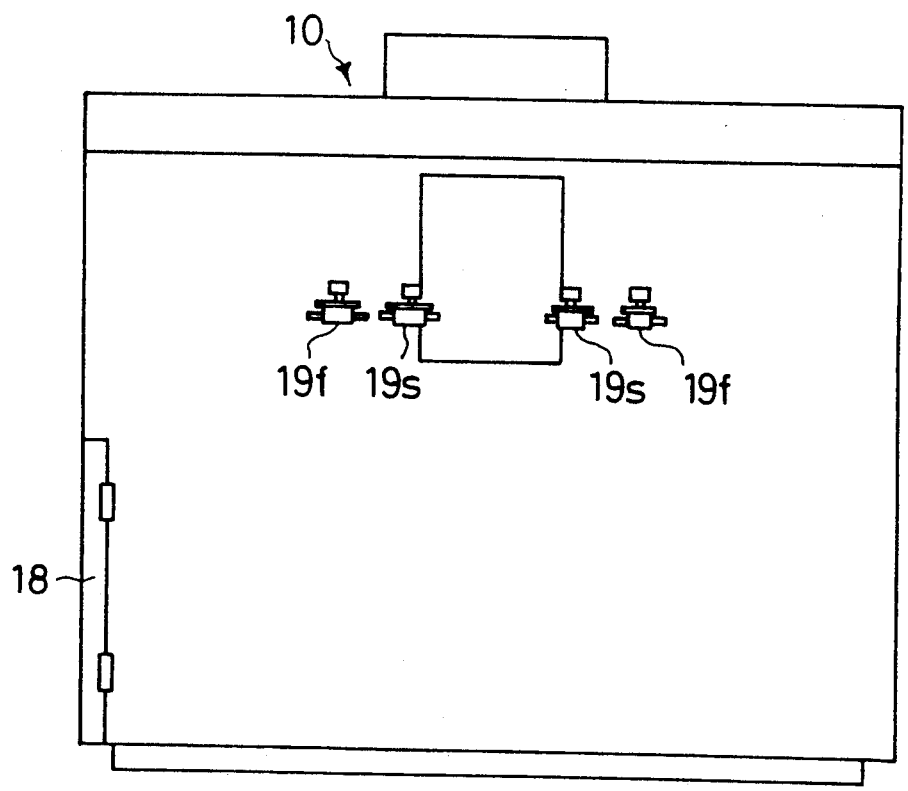
FIG. 5 is a rear elevational view of said vacuum cast molding apparatus.

As shown in FIG. 5, slow leak valves 195 and fast leak valves 198 are attached to each vacuum chamber in the rear side of the basic body 10. Each of the slow leak valves can introduce a small quantity of air into the vacuum chamber 11 or 12 when operated. And each of the fast leak valves 198 can introduce a large quantity of air at once into the vacuum chamber 11 when operated.

The operation of the vacuum cast molding device described above in which the cast molding is carries out using the first vacuum chamber 11 is described below.

In the cast molding operations, a silicon die S1 made of silicon rubber and having an internal cavity with the same form as that of products to be molded is used.

As shown in FIG. 1, a first lower door 17 attached to the front lower portion of the first vacuum chamber 11 is opened and the silicon die S1 is placed in the lower portion of the first vacuum chamber 11. On the other hand, the A cup 24 with curing agent stored therein and the B cup 25 with a main material for cast molding, (for instance, polyurethane resin), are set in the mixing and injecting device for the first vacuum chamber 11. Then, after the door is closed, the vacuum chamber is evacuated. The curing agent and the main molding material are defoamed in a vacuum state.

Vacuum defoaming is to eliminate bubbles generated in the main material in a liquid state and the curing agent by evacuating inside of the vacuum chamber 11 (for instance, to a level of around $7.5 \times 10^{-4}$ Torr.)

Figure 2:
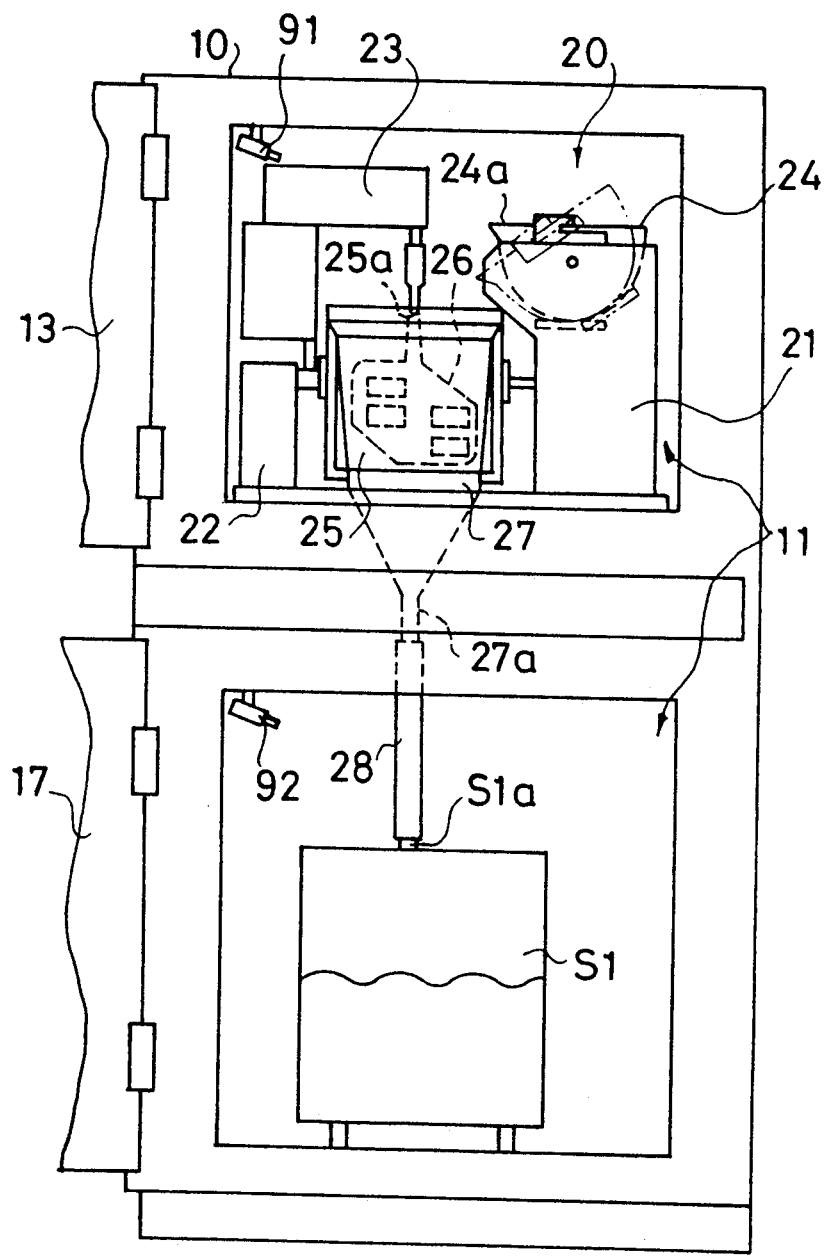
FIG. 2 is a front view of a mixing and injecting device in said vacuum cast molding apparatus.

When the vacuum defoaming is finished, the curing agent feeding device 21 is driven by operating the first operator panel 15 and keeping a steady state in the vacuum chamber. The curing agent is fed from the A cup 24 into the B cup 25, as shown in FIG. 2. Then, the agitating device 23 is driven to mix the main liquid material with the curing agent and agitate the mixture, molding materials thus being produced.

Figure 6:
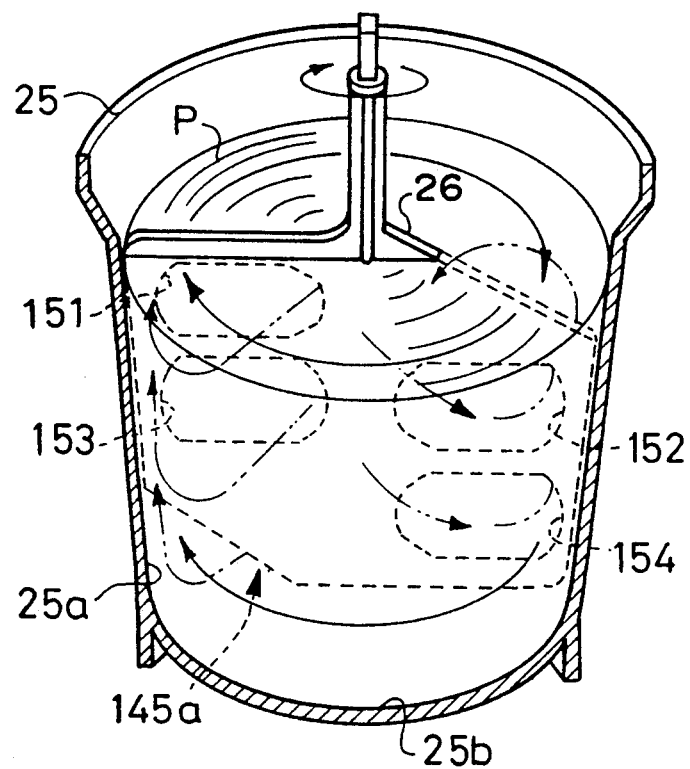
FIG. 6 is a schematic drawing illustrating operation of the aforesaid vane for agitation.

As shown in FIG. 6, when the agitating vane 26 rotates on the rotating shaft 142a, materials P for cast molding are agitated in the horizontal direction. The vane portion 141 sweeps along the entire internal wall 25a and the entire base 25b of the B cup 25, so that uneven agitation of molding materials never occurs.

The molding materials at the center of the B cup 25 are guided by said guide wings 161 to 166 so that the materials are pushed downward, and then the materials are pushed towards the outer periphery of the B cup 25 as a result of the centrifugal force generated by rotation of the vane portion 141. During such operation, as shown by a broken line in the figure, the materials move through such regions as the through-holes 151 to 154 or the passage space 145a. A vertical flow of the molding materials is generated because the materials are gradually pushed downward to the periphery. The materials P for cast molding are agitated in the vertical direction.

An intermittent operation of rotating the agitating vane 26 for a specified period of time, (for instance, for 10 seconds), and then stopping it for a specified short period of time, (for instance, for 1 second), is carried out in this agitating device 23. As a result this intermittent operation, the efficiency in agitation of the materials P for cast molding can be improved.

After the materials are fully mixed and agitated, operation of the agitating device 23 is stopped. Then a slow leak valve 19s attached to the rear surface of the basic body 10 is opened for a short period so that a very small quantity of air is introduced into the first vacuum chamber 11. This operation raises, the air pressure in the first vacuum chamber 11 a little, so that bubbles generated in the materials for mast molding are crushed and smooth molding materials can be obtained.

Then, the injecting device 22 is operated, and the B cup 25 is inclined forward so that the injection port 25a moves downward, to pour the molding materials into the funnel 27. As a partial vacuum state is maintained during this operation, the molding materials flow smoothly into the silicon die S1 through the hose 28 and the injection port S1a from the funnel 27.

Figure 7:
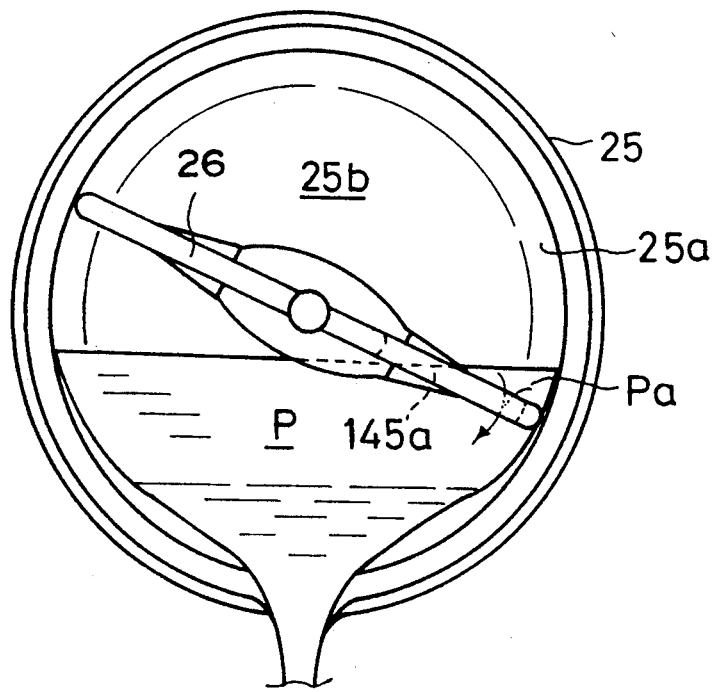
FIG. 7 is a front elevational view illustrating removal of agitated materials from a vessel.

As shown in FIG. 7, molding materials P under the agitating vane 40 flow smoothly out of the B cup 25, but also the materials P residing above the agitating vane 40 can flow to the portion under the agitating vane 40 through the passage space 45a to the outside. Flow of molding materials P into the B cup 25 is not prevented by the agitating vane 40.

After all molding materials are poured out from the B cup 25, the injecting device 22 is operated to return the B cup 25 to the original position. Furthermore, operation of the first vacuum pump 31 is stopped, and the slow leak valve 19s is opened again to introduce a very small quantity of air into the first vacuum chamber 11. As a result of this operation, pressure in the first vacuum chamber 11 is raised a little, and molding materials can gradually and accurately spread to every innermost corner of the silicon die S1.

After all molding materials are poured (or injected) into the silicon die S1, a first leak valve 19f is opened to raise the pressure in the first vacuum chamber 11 to the normal atmospheric pressure. Then, a buzzer (not shown) or a caution lamp attached to the basic body 10 operates to alert the operator to the end of the operation to the operator.

The silicon die S1 poured with molding materials as described above is taken out through the first lower door 17 and cured (or solidified) in a drying furnace (not shown). Then a molded product is taken out from the die, thus a final mold product having the same form as that of the internal cavity of the silicon die S1 is made.

Figure 18:
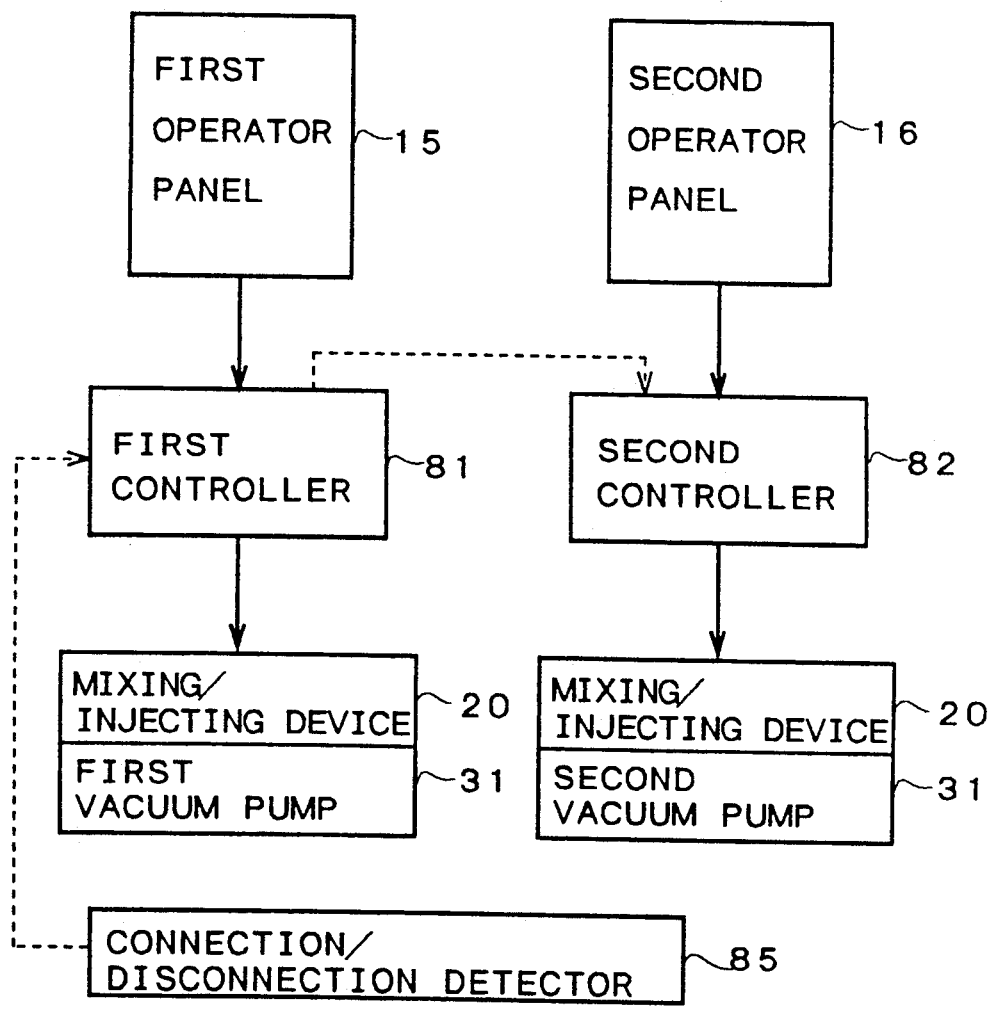
FIG. 18 is a block diagram of a control system for said vacuum cast molding apparatus.

In the cast molding apparatus, each of the operations described above can be carried out by operating the first operator panel 15, and instructions for the operations are stored in a memory of a first controller (See FIG. 18). Accordingly, once instructions are issued for each of the above operations, the same operations are carried out and controlled according to memory stored in the first controller. In addition, a working time required for each operation is displayed on the first panel 15, and the total operating time in the cast molding apparatus is also displayed. The information is available for maintenance or other operations.

It is also possible to carry out cast molding operations in the second vacuum chamber 12 by operating the second operator panel 16. Using this feature, two different sets of cast molding operations can be carried out concurrently by using the cast molding apparatus 1. (Each set of operations is carried out independently). The operations of the mixing and injecting device 20 and the vacuum pump 32 in the second vacuum chamber 12 are controlled by a second controller (See FIG. 18) mounted in the second vacuum chamber 12.

When the silicon die S1 is taken out to cure the molding materials, it is necessary to remove the vinyl hose, from funnel 28 and the silicon die S1. If the vinyl hose 28 is bent or broken during removal of the hose, materials remaining in the vinyl hose 28 may spill out.

For the next cast molding work, it is necessary to set a new vinyl hose 28 between the funnel 27 and a new silicon die (not shown). But if the height of the new silicon die is different from that of the old silicon die S1, the length of the vinyl hose 28 must be adjusted each time the operation is carried out.

Figure 8:
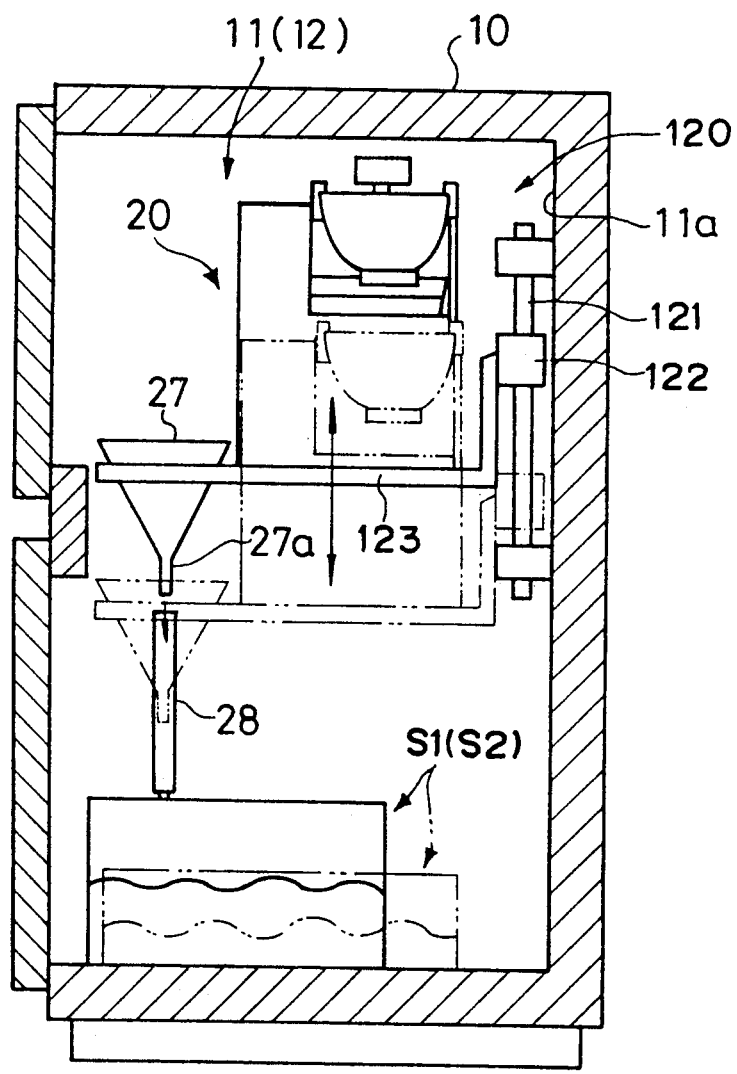
FIG. 8 is a side view, partly in cross section of the vacuum cast molding apparatus described above.

For that purpose, a lift device 120 as shown in FIG. 8 is arranged in each of the vacuum chambers 11 and 12. FIG. 8 shows the inside of the vacuum chamber.

The lift device 120 comprises a screw shaft 121 attached to the upper portion of the internal wall 11a of the first vacuum chamber so that said screw shaft extends in the vertical direction, a lift device 122 which is engaged with the screw shaft 121 and moves the screw shaft 121 in the vertical direction, and a lift bench 123 which extends forward from the front lower portion of the lift device 122. The above-described mixing and injecting device 20 and the funnel 27 are mounted on the top face of the lift bench 123, which can be raised or lowered in the vacuum chamber 11 by driving the lift device 122.

When removing the used vinyl hose 28, a discharge port 27a of the funnel 27 can easily be detached from the upper opening of the used vinyl hose 28 by slightly raising the mixing and injecting device 20 from a position for ordinary cast molding operations. When attaching a new vinyl hose 28 to the discharge port 27a of the funnel 27 and the new silicon die S1 or S2 as shown in FIG. 8, the upper opening of the new vinyl hose 28 can easily be connected to the discharge port 27a of the funnel 27 by previously attaching the vinyl hose 28 to the silicon die S1 (or S2) and then lowering the mixing and injecting device 20.

Furthermore, by raising or lowering the mixing and injecting device 20 according to a height of the new silicon die S1 (or S2) by using the lift device 120, only one kind of vinyl hoses 28 having a specified length, can be used for various silicon dies.

In addition, the weight and the size of the mixing and injecting device are substantially lighter and smaller than those of the silicon die S1 (or S2). In addition, the weight of molding materials is substantially smaller than that of the silicon die S1 (or S2). Accordingly, a big space is not required for the lift device 120 in the vacuum chamber 11, and a working space can fully be ensured in the vacuum chamber 11.

The cast molding operations being carried out in the vacuum chambers 11 and 12 can be observed through the viewing windows 13a, 14a, 17a and 18b, each provided in the front wall face or the door of each vacuum chamber.

However, the operator's panels arranged at the center of the upper portion of the basic body 11 are substantially removed from the viewing windows 13a and 14a provided in the right and left sides of the basic body 10. The operator must move between the viewing windows 13a, 14a, 17a and 18a and the operator panels 15 and 16 for each operation to carry out the operations monitoring the operations through the viewing windows 13a, 14a, 17a and 18a, which is very troublesome. Particularly when it is necessary to observe operations through the viewing windows 17a and 18a provided in the lower portion, the operator bend must stoop down or crouch. To solve this problem, a monitoring device is attached to the cast molding apparatus.

As shown in FIG. 1 and FIG. 2, the monitoring device comprises an upper TV camera 91 (or 93) attached to the upper portion of the vacuum chamber 11 (or 12), a lower TV camera 92 (or 94) attached to the lower portion of the vacuum chamber 11 and (or 12), and a display unit 95 (or 96) to display images from the TV cameras 91 and 92. The display units 95 and 96 are located directly above (or at adjacent positions to) the operator panels 15 and 16. Images photographed by each of the upper TV cameras 91 and 93 and by each of the lower TV cameras 92 and 94 can be displayed on either the display unit 95 or display unit 96 arbitrarily by switching and operating the operator panels 15 and 16.

Using the monitoring device as described above, cast molding operations in the vacuum chambers 11 and 12 can easily be monitored through the display units 95 and 96 without observing inside through the viewing windows 13a, 14a, 17a and 18a. For this reason, an operator can carry out cast molding operations in the vacuum chambers 11 and 12 efficiently by operating the operator panels 15 and 16 and watching the display.

If the viewing window is merely plate glass, the viewing window is easily broken by an impact loaded from the outside.

Figure 9:
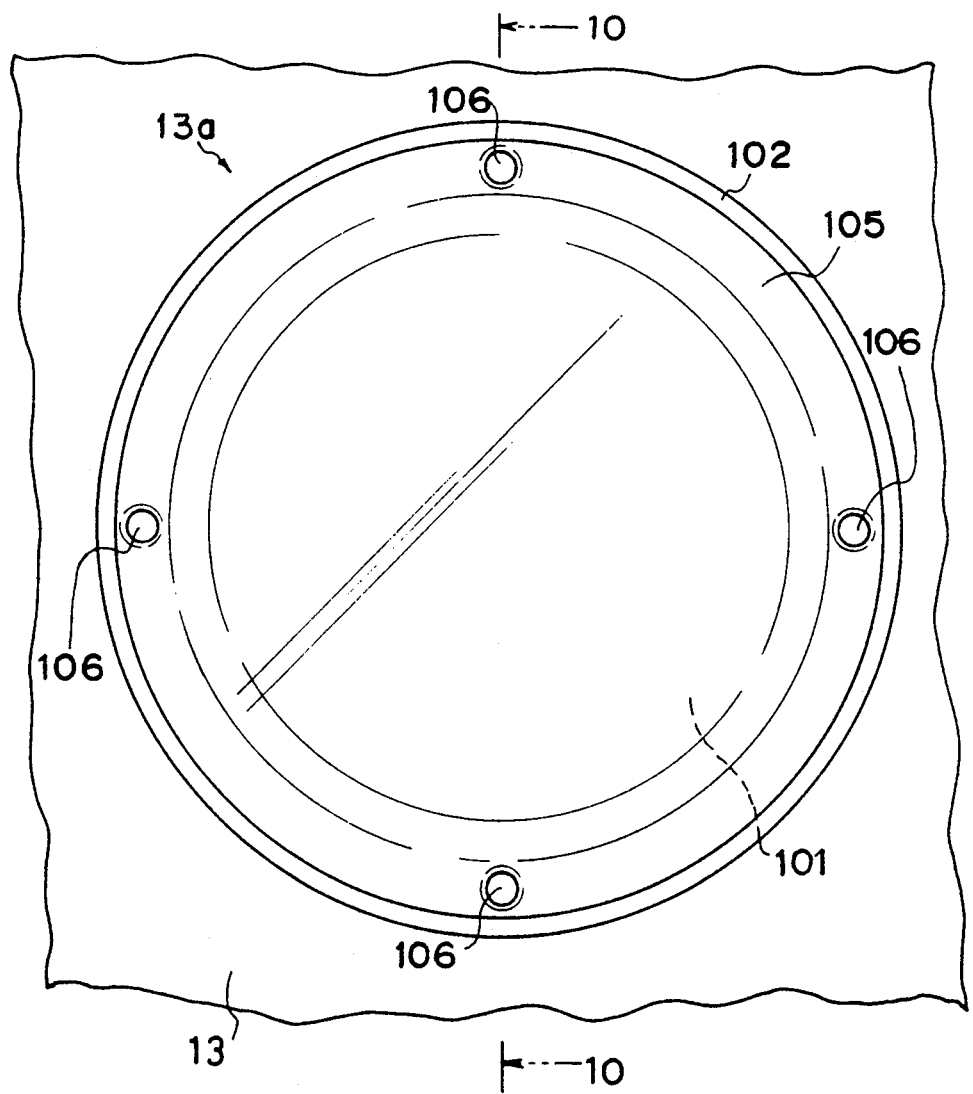
FIG. 9 is a front elevational view of a viewing window in the aforesaid vacuum cast molding apparatus.
Figure 10:
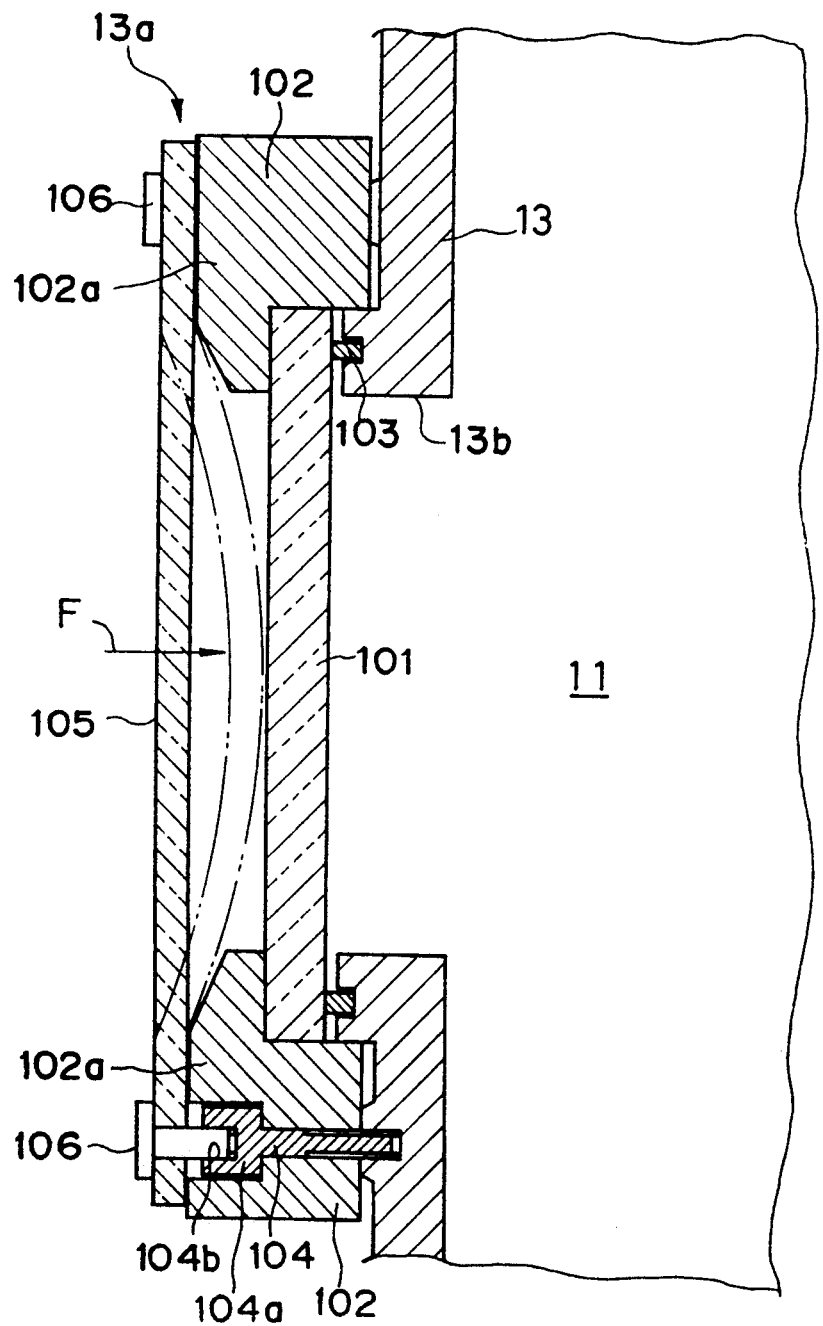
FIG. 10 is a cross section of said viewing window on line 10-10 of FIG. 9.

To prevent this, the viewing window in the cast molding apparatus 1 according to the present invention is constructed as shown in FIG. 9 and FIG. 10. These figures show a viewing window 13a attached to an upper door 13 of the first vacuum chamber 11. It should be noted that other viewing windows have the same construction.

A sheet of circular, thick plate glass having a diameter which is a little larger than that of the opening portion 13b is placed at the external front portion (in the left side in FIG. 10) formed at the center of the upper door 13. The thick plate glass 101 is fixed by a setting frame 102 attached to the external periphery so that said plate glass is pressed to the periphery of the opening portion 13b in the front portion of the upper door 13. A packing 103 is placed between the thick plate glass 101 and the upper door 13, so that the air-tightness in that portion is ensured. The setting frame 102 is attached to the upper door 103 by bolts at four places, the upper, lower, right and left portions of the setting frame 102. The bolts 104 fix the setting frame 102 to the front surface of the upper door 13 by being screwed into a front edge surface 102a of the setting frame 102 until its head is buried into the surface. A hexagonal hole 104b opening frontward is formed on the head portion 104a.

A covering member having the form of a circular plate which covers the front surface (external surface) of the thick plate glass 101 is attached to the front edge face 102a of the setting frame 102 so that said member tightly adheres to the thick plate glass. The covering member is made of transparent plastic, so that an operator can observe the inside of the first vacuum chamber 11 through the thick plate glass 101. The covering member 105 is attached to the setting frame 102 by inserting a fitting tool 106 attached to the covering member 105 and inserting the member into the hexagonal hole 104a formed on the head portion 104a of the bolt 104.

In the viewing window 13a constructed as described above, as shown in FIG. 9, even if an impact F is applied to the viewing window 13a from the outside, the impact F is absorbed by the covering member 105 so that any impact will not be loaded directly onto the thick plate glass 101. For this reason, breakage of the thick plate glass 101 can be prevented to a great extent.

If the thick plate glass 101 should be broken under evacuation of the first vacuum chamber 11, as the covering member 105 closely adhere to the setting frame 102, only a very small quantity of air is gradually sucked into the vacuum chamber 11, and most broken pieces of the thick plate glass 101 only drop into the first vacuum chamber 11. Even if some glass pieces are deflected towards the outside, the pieces are blocked by the covering member 105, and do not scatter outside the first vacuum chamber 11.

Figure 11:
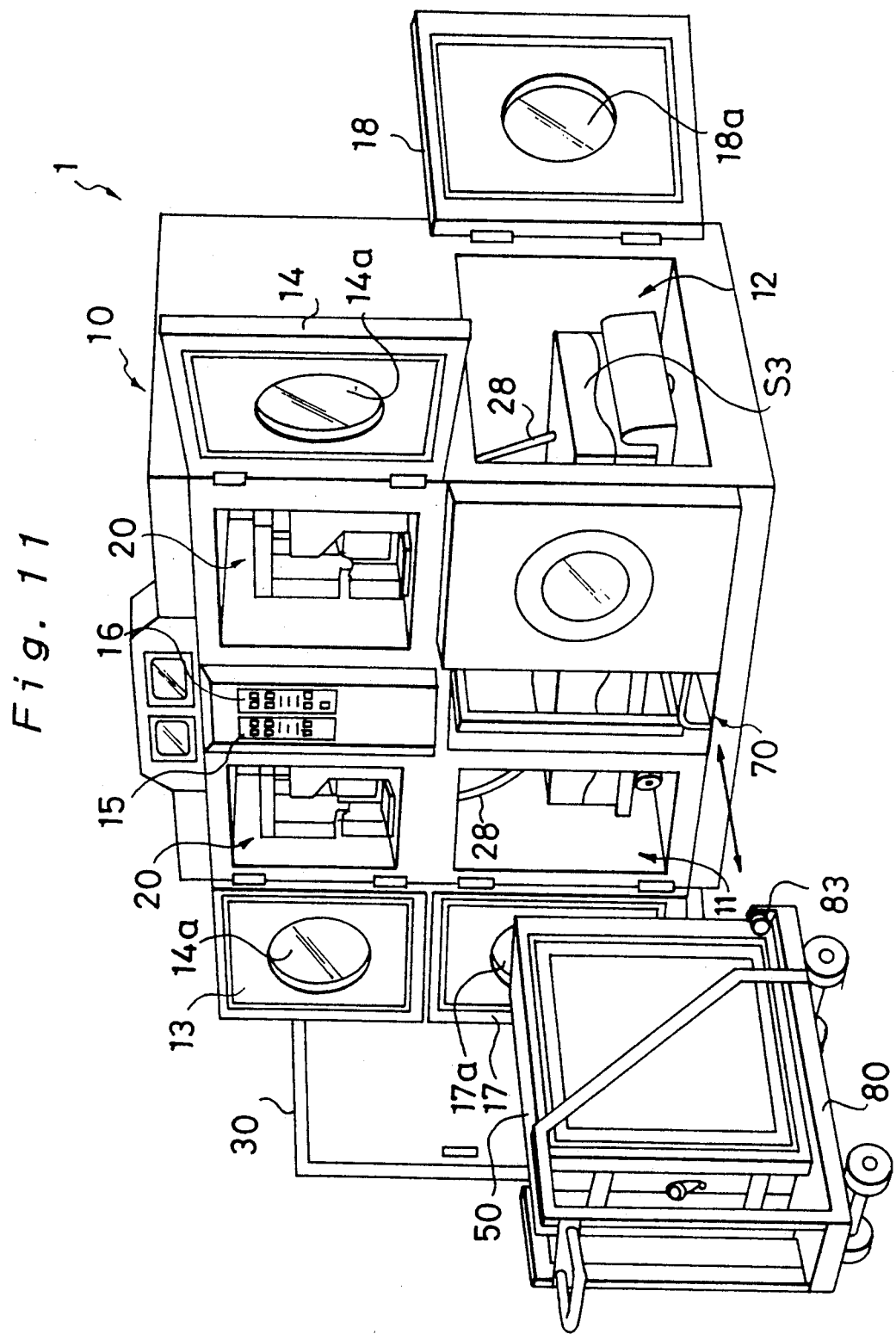
FIG. 11 is a perspective view of said vacuum cast molding apparatus.
Figure 12:
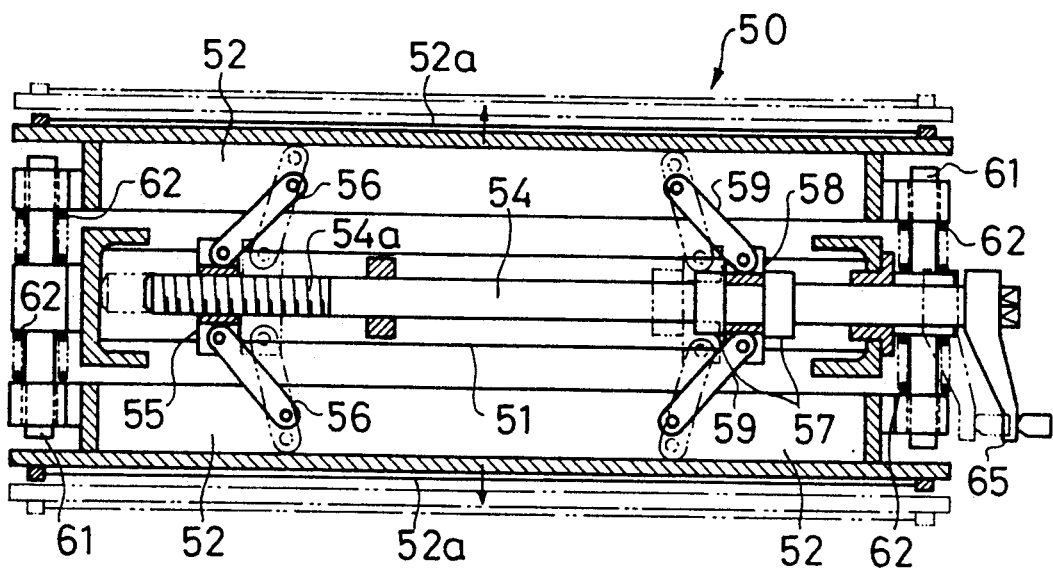
FIG. 12 is a plan view, partly in cross section for a separator used in said vacuum cast molding apparatus.

In the cast molding apparatus, as shown in FIG. 11, a separator 50 is detachably installed between the lower portion of the first vacuum chamber 11 and the lower portion of the second vacuum chamber 12. The construction of the separator 50 is described below with reference to FIG. 12 (plan view), FIG. 13 (side view) and FIG. 14 (front view).

The separator 50 comprises a central supporting frame 51 and two partition plates 52 and 52 located on both sides of this central supporting frame 51.

Figure 13:
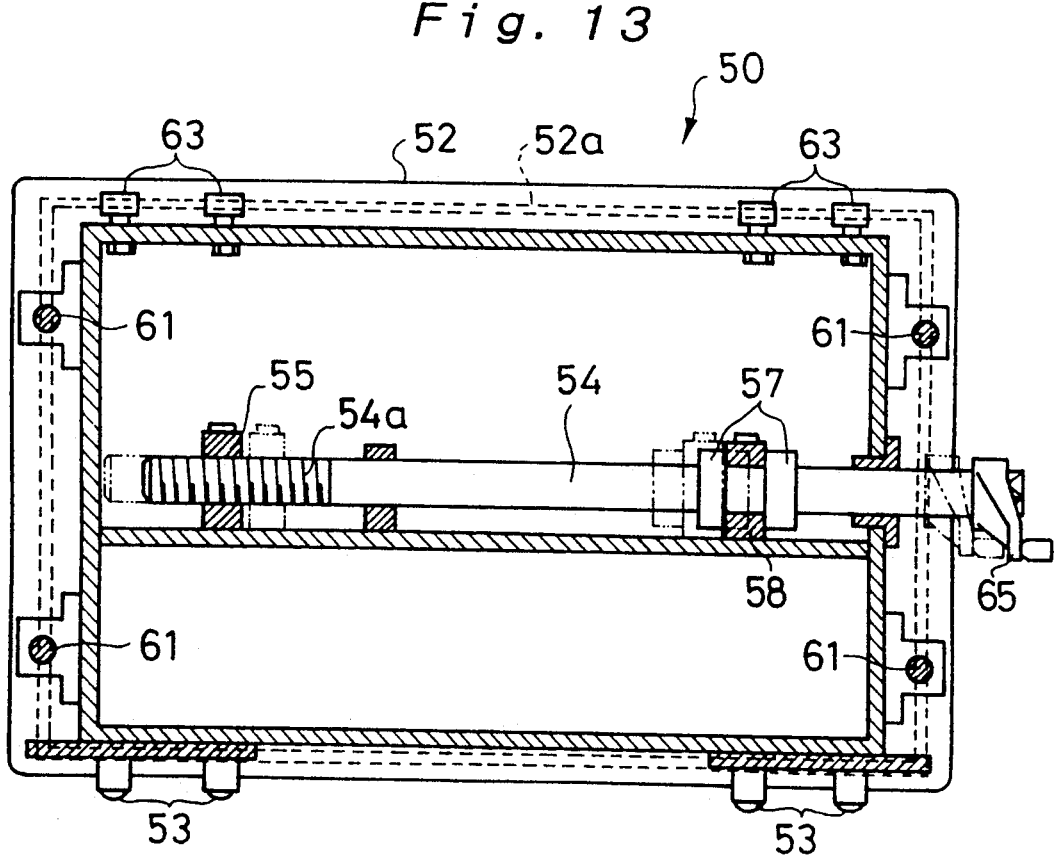
FIG. 13 is a side view, partly in cross section of said separator.
Figure 14:
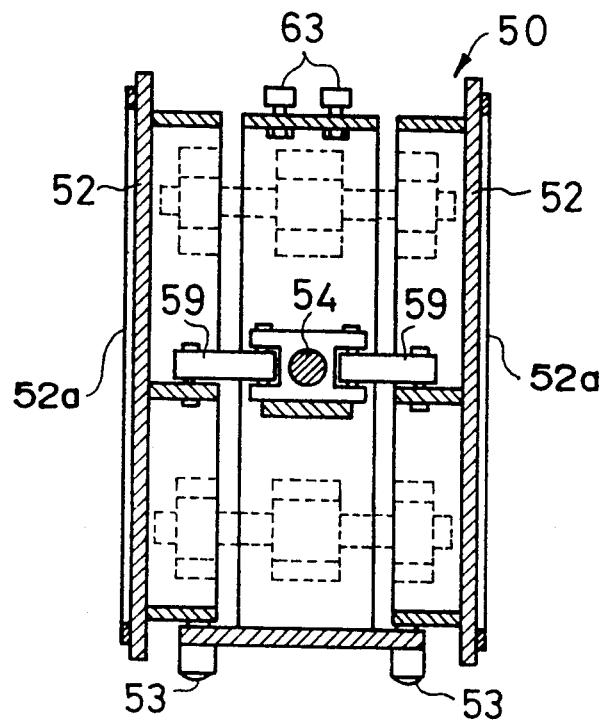
FIG. 14 is a front view, partly in cross section of said separator.

As shown in FIG. 13 and 14, a plurality of spherical rollers 53, . . . , 53 are arranged on both sides in the of the bottom face of the central supporting frame 51 in a row respectively along the rearward direction of the central supporting frame 51, and support the entire separator 50 for its movement in both the longitudinal and lateral directions. An input shaft 54 is attached for rotation and sliding movement in the rearward direction to a middle portion of the central supporting frame so that said input shaft extends in the rearward direction. A male screw portion 54a is formed in the rear portion of the input shaft 54, and this screw portion 55 is screwed into a female screw portion 54a supported for sliding movement in the rearward direction against the central supporting frame 51. Both sides of the female screw component 55 are pivotally linked to internal sides of the rear portions of the partition plates 52 and 52 via the rear portion connecting components 56 and 56.

Two sleeve components 57 and 57 are attached to the front periphery portion of the input shaft 54 at a specified interval in the rearward direction, and a component 58 which follows the movement of the input shaft 54 is clamped between the sleeve components 57 and 57. Because of this construction, when the input shaft 54 slides in the rearward direction, the component 58 also moves in the same direction following the movement of the input shaft 54. Both sides of this component 58 are connected to the front internal portions of the partition plates 52 and 52 via the front portion connecting components 59.

Slide supporting components 61, each of rod form, are attached to the upper and lower portions of the front and rear edges of the central supporting frame 51 (at four places in total) in a laterally extending state, and the partition plates 52 and 52 are supported for sliding movement along these slide supporting components 61. A spring 62 is attached to the each slide supporting frame 61 between the ventral supporting frame 51 and the partition plate 52. The spring pushes the partition plate 52 outward in the lateral direction. Furthermore, a plurality of guide rollers 63 are attached to the top face of the central supporting frame in two rows in the reward direction. Each of the guide rollers can freely rotate horizontally.

As shown in FIG. 11, the separator constructed as described above can be set in or removed from the basic body 10 by inserting it into or removing it from the separator accepting portion 70 formed between the first vacuum chamber 11 and the second vacuum chamber 12 in the basic body 10.

Figure 15:
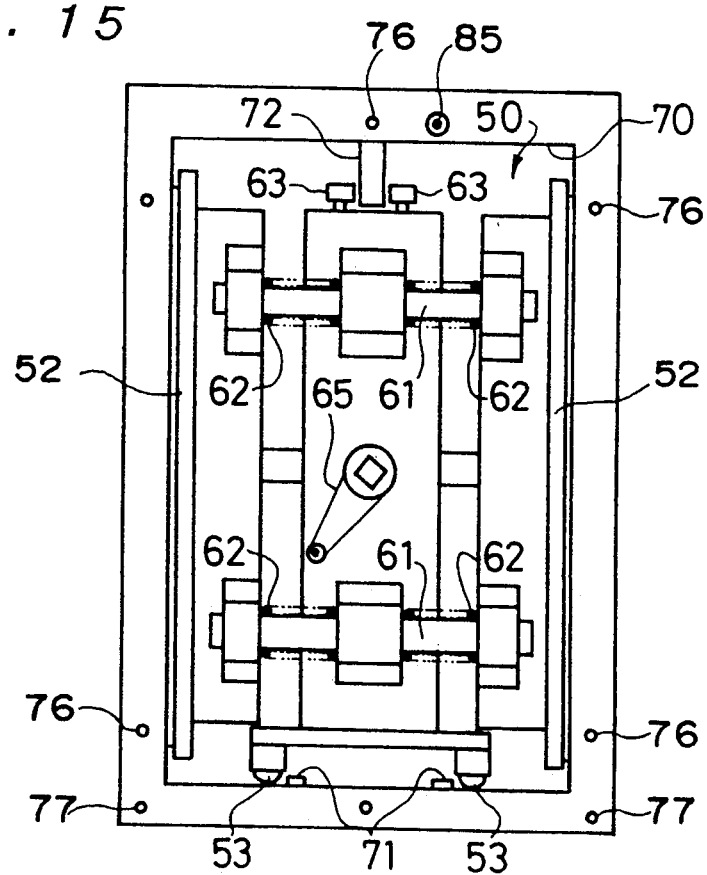
FIG. 15 is a front view of said separator inserted into and mounted in a separator accepting portion in said vacuum cast molding apparatus.

FIG. 15 shows a state where the separator 50 has been assembled. On the base of the separator 70 are arranged two lower guide rails 71 and 71, each extending to the depth of the separator accepting portion 70 in parallel relation to each other, while on the ceiling of the separator accepting portion 70 is attached an upper guide rail 72 extending for the depth of the separator accepting portion 70. When inserting the separator 50 into each separator accepting portion 70, the spherical roller 53 attached to the lower portion of the central supporting frame 51 is guided by the external surface of the corresponding lower guide rail 71. In addition, the guide roller 63 attached to the top face of the central supporting frame 51 is guided by the side face of the upper guide rail 72. The separator 50 can easily be inserted into the center of the separator accepting portion 70.

In the separator 50 inserted as described above, when a handle 65 attached to the front edge portion of the input shaft 54 is operated, the input shaft rotates in the specified direction, the female screw portion 55 slides forward as a result of the engaging force with the rotating input shaft 54 allowing the two partition plates 52 and 52 to be pushed outwardly in the horizontal direction because of a driving force of the springs 62. The following component 58 moves rearward together with the input shaft 54 moving rearward against the female screw component 55, allowing the both partition plates 52 and 52 to move outwardly in the horizontal direction.

Thus, when the separation between the two partition plates 52 and 52 in the horizontal direction is increased, the two partition plates 52 and 52 approach the right and left openings of the separator accepting portions 70 respectively. Then the packing 52a attached on the external surface of the partition plate 52 comes in contact with the opening, the vacuum chambers 11 and 12 thus being completely sealed.

The two partition plates 52 are pushed strongly to the right and left openings of the separator 70 by the springs 62 and 62. For this reason, even if only the first vacuum chamber 11 is evacuated with the central supporting frame 51 pulled to the left side and moved according to the backlash in the same direction, the partition plate seals the second vacuum chamber 12 tightly.

Movement of such components as the central supporting frame 51 in the horizontal direction can be permitted by rotation of the spherical rollers 53.

If the input shaft 54 is rotated in the direction opposite to that described above by operating the handle 65, the female screw components 55 move rearward backward pulling the two partition plates 52 and 52 inward. In addition the following component 58 pulls the two partition plates 52 forward together with the input shaft 54. Thus, after separating the two partition plates 52 and 52 from the portions around the right and left openings of the separator accepting portions 70 by reducing the horizontal distance between the two partition plates 52 and 52, the separator 50 can easily be pulled out to the front portion of the basic body 10.

As shown in FIG. 11, transportation of the separator 50 before installing it to the basic body 10 or after removing it from the basic body 10 is performed by using a carrier 80. At both ends of the carrier 80, a screw 83 for setting the carrier 80 is attached (Note that only the right portion is shown in the figure). When installing the separator 50 into or removing it from the separator accepting portion 70, the carrier 80 must be fixed to the basic system 10 by screwing the screw 83 to screw holes 77 formed in the right and left portions of the separator accepting portion 70. By using this construction, it is possible to prevent the separator 50 from dropping off when installing or removing it.

After the separator 50 is removed, an internal cover 75 is attached to the separator accepting portion 70 so that said internal cover completely covers the front opening of the separator accepting portion 70. This internal cover 75 has a packing 75a, and can seal the separator accepting portion 70. In this construction, the lower portions of the two vacuum chambers 11 and 12 are in communication with each other, and one large vacuum chamber (called connected vacuum chamber hereinafter) is formed.

Figure 17:
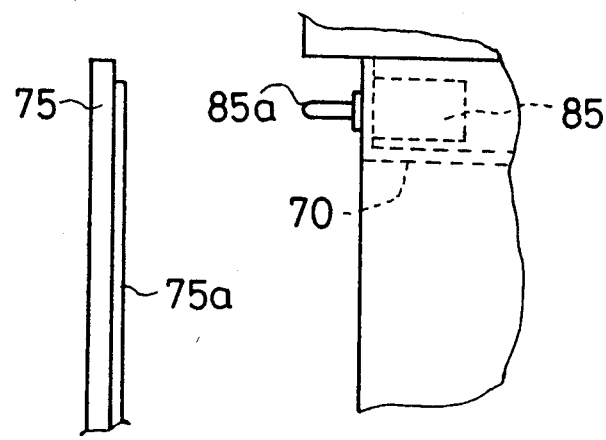
FIG. 17 is a side view of the a frame portion adjacent said separator accepting portion.

The internal cover 72 is fixed to the front opening of the separator accepting portion 70 by screws. As shown in FIG. 17, a connection and disconnection detector 85 is incorporated in the upper portion of the area around the front opening portion, and a detection rod 85a of the connection and disconnection detector 85 protrudes frontward to the outside. When the internal cover 75 is attached to the front opening of the separator accepting portion 70 to completely cover it, a switch rod 85a is pushed in by the internal cover 75, and the connection and disconnection detector 85 provides a detection signal.

The detection signal output from the connection and disconnection detector 85 is sent to the first controller 81, as shown in FIG. 18. The controller 81 also sends the operation signal received from the first operator panel 15 to the second controller 82 to make the second controller 82 carry out the same controlling operations as those carried out by the first controller 81. By this operation, the mixing and injecting device 20 and the first vacuum pump 31 and the mixing and injecting device 20 and the second vacuum pump 32 are controlled correlatively, so that the cast molding apparatus 1 functions as one cast molding apparatus having intercommunicating vacuum chambers. As shown in FIG. 11, a long silicon die S3 can be installed in the connected vacuum chambers (11,12). A detection signal output from the connection and disconnection detector 85 may also be sent to both the controllers 81 and 82 so that all the mixing and injecting devices 20, 20 and the vacuum pumps 31 and 32 can be controlled correlatively by either of the operating panels 15 or 16.

If the internal cover 75 is removed from the front opening portion of the separator accepting portion 70 to install the separator 50, output of the detection signal from the connection and disconnection detector 85 is stopped. Then, correlative operations of the first controller 81 and the second controller 82 cease, and each of the controllers 81 and 82 provides control operations according to operation signals from the operator panels 15 and 16, independently.

Figure 16:
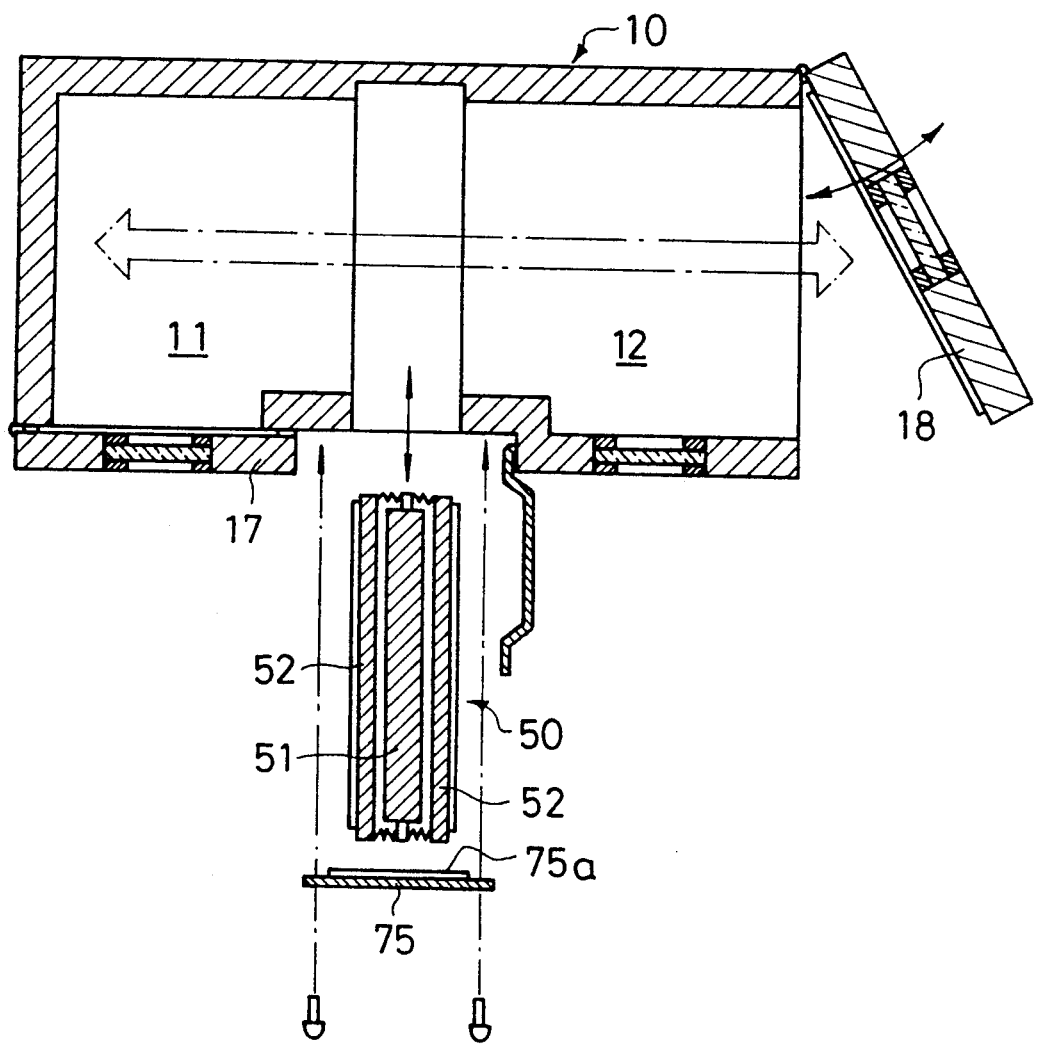
FIG. 16 is a cross-sectional view in a horizontal plane of said vacuum cast molding apparatus.

In the cast molding apparatus 1, a side face of the second vacuum chamber is built as a door which can freely be opened or closed (second lower door 18). As shown in FIG. 16, the connecting vacuum chambers (11 and 12) can be opened to the outside in the connecting direction by opening the second lower door 18. As a result, the long silicon die S3 can easily be put in or taken out.

Though the above description concerns a vacuum cast molding apparatus having two vacuum chambers, a vacuum cast molding apparatus can have three or more vacuum chambers.

In addition, when a cast molding operation is carried out using a long silicon die S3, two funnels 20 and 20 can be connected to the long silicon die S3 using vinyl hoses 28 having a specified length by raising and lowering each of the mixing and injecting devices 20 and 20 by driving each lift device 120, mounted in each of the vacuum chambers 11 and 12. Then, the two lift devices 120 can be driven one by one and connection or disconnection of the two vinyl hoses 28 and 28 can easily be achieved.

What is claimed is:

1. A vacuum cast molding apparatus comprising:
   a plurality of vacuum chambers which can be brought into communication with each other;
   a plurality of depressurizing devices for evacuating respective vacuum chambers;
   a plurality of mixing and injecting devices installed in respective vacuum chambers, for mixing, agitating and injecting molding materials into molding dies installed in respective vacuum chambers; and
   separators installed removably between said vacuum chambers for partitioning each of said vacuum chambers;
   wherein each of sid vacuum chambers can be used independently when said separators are installed, and said plurality of vacuum chambers can be used as one large vacuum chamber when said separators are removed.

2. A vacuum cast molding apparatus according to claim 1; wherein
   said vacuum chambers are placed in series in a lateral direction so that said plurality of vacuum chambers form one laterally enlarged vacuum chamber when said separators are removed;
   said vacuum chambers have doors, respectively;
   one of said vacuum chambers which is located at one end has an opening on a side wall thereof for mounting said door, said opening facing said laterally enlarged vacuum chamber in a lateral direction, and
   other of said vacuum chambers have openings on respective front walls thereof for mounting respective of said doors.

3. A vacuum cast molding apparatus according to claim 1, further comprising;
   a controller for controlling said depressurizing devices and said mixing and injecting devices; and
   connection and disconnection detecting means for detecting whether said separators are installed or removed;
   wherein, said controller controls each of said depressurizing devices and mixing and injecting devices independently when said detecting means detects that said separators are installed; while said controller controls said depressurizing devices and said mixing and injecting devices correlatively when said detecting means detects that said separators are removed.

4. A vacuum cast molding apparatus according to claim 3, wherein;
   operating panels are provided on respective vacuum chambers;
   when said detecting means detects the installation of said separators, said controller controls said depressurizing devices and said mixing and injecting devices independently in response to control signals from a corresponding operating panel; and
   when said detecting means detects the removal of said separators, said controller controls said depressurizing devices and said mixing and injecting devices correlatively based on control signals from one of said operating panels.

5. A vacuum cast molding apparatus according to claim 1, wherein;
   said separator comprises a pair of partition plates mounted parallel with each other, and an expanding and contracting means to move said partition plates laterally;
   said separator is inserted into a separator accepting portion formed between adjacent of said vacuum chambers; and
   said partition plates can be expanded outwardly in the lateral direction by said expanding and contracting means into sealing engagement with the side walls of adjacent of said vacuum chambers thereby to partition said adjacent vacuum chambers from each other in air tight manner.

6. A vacuum cast molding apparatus according to claim 1, wherein;
   camera means for monitoring molding operations in the vacuum chamber and display means linked to said camera means for displaying images received said camera means are provided in respective vacuum chambers.

7. A vacuum cast molding apparatus according to claim 1, wherein;
   viewing windows for observing the molding operations in the vacuum chamber are provided on respective vacuum chambers, and
   each viewing window comprises a glass plate attached to an aperture formed in a wall of said vacuum chamber, and a covering plate member made of transparent plastic and attached to the aperture so as to cover said glass plate from outside.

8. A vacuum cast molding apparatus according to claim 1, wherein;
   said mixing and injecting devices are placed in respective upper portions of respective vacuum chambers and located but said respective dies which are placed in lower portions thereof respectively, and lift devices are provided for moving respective mixing and injecting devices vertically.

9. A vacuum cast molding apparatus comprising:
   a pair of vacuum chambers which can be brought into communication with each other;
   a pair of depressurizing devices for evacuating respective vacuum chambers;
   a pair of mixing and injecting devices installed in respective vacuum chambers, for mixing, agitating and injecting molding materials into molding dies installed in respective vacuum chambers; and
   a separator installed removably between said vacuum chambers for partitioning said vacuum chambers from each other,
   wherein each of said two vacuum chambers can be used independently when said separator is installed, and said two vacuum chambers can be used as one large vacuum chamber when said separator is removed.

10. A vacuum cast molding apparatus according to claim 9; wherein
    said vacuum chambers are placed in series in a lateral direction so that said vacuum chambers form one laterally enlarged vacuum chamber when said separator is removed;
    said vacuum chambers have doors respectively;
    one of said vacuum chambers has an opening on a side wall thereof for mounting said door, said opening facing said laterally enlarged vacuum chamber in a lateral direction, and the other of said vacuum chambers has an opening on a front wall thereof for mounting the other of said doors.

11. A vacuum cast molding apparatus according to claim 9, further comprising;

a controller for controlling said depressurizing devices and said mixing and injecting devices; and connection and disconnection detecting means for detecting whether said separator is installed or removed;

wherein, said controller controls each of said depressurizing devices and mixing and injecting devices independently when said detecting means detects that said separator is installed; while said controller controls said depressurizing devices and said mixing and injecting devices correlatively when said detecting means detects that said separator is removed.

12. A vacuum cast molding apparatus according to claim 11, wherein;

operating panels are provided on vacuum chambers;

when said detecting means detects the installation of said separator, said controller controls said depressurizing devices and said mixing and injecting devices independently in response to control signals from a corresponding operating panel; and when said detecting means detects the removal of said separator, said controller controls said depressurizing devices and said mixing and injecting devices correlatively based on control signals from one of said operating panels.

13. A vacuum cast molding apparatus comprising:

a housing having an elongate main chamber providing a plurality of vacuum chamber zones opening into each other in side by side relation;

a plurality of depressurizing devices for evacuating respective vacuum chamber zones;

a plurality of mixing and injecting devices installed in respective vacuum chamber zones for mixing, agitating and injecting molding materials into at least one molding die installed in the vacuum chamber zones; and, separating means movable between operable and inoperable positions, extending between adjacent vacuum chamber zones across the opening and in sealing engagement therewith, and remote from the opening, respectively, so that the main chamber is partitioned into a plurality of individual, independently operable vacuum chambers corresponding to respective zones and forms a single, composite elongate vacuum chamber comprising the plurality of vacuum chamber zones, respectively.

14. A vacuum cast molding apparatus according to claim 13, in which:

the main chamber has opposite, elongate, front and rear walls;

molding die access doors are mounted extending between the front and rear walls across one longitudinal end of the main housing so that they open into an endmost vacuum chamber zone and on the front wall at a location corresponding to a zone other than the endmost zone.

15. A vacuum cast molding apparatus according to claim 14, in which:

an access opening is provided in one elongate wall of the main chamber, through which access opening the separating means can be moved between positions into and out from the main chamber, respectively; and, means are provided to close and seal the access opening when the separating means is moved out of the main chamber to the remote position.

* * * * *